United States Patent
Rohrbough et al.

(10) Patent No.: US 10,452,762 B1
(45) Date of Patent: *Oct. 22, 2019

(54) COORDINATING IN-FRAME CONTENT WITH PAGE CONTENT IN APPLICATIONS

(71) Applicant: United Services Automobile Association (USAA), San Antonio, TX (US)

(72) Inventors: Richard R. Rohrbough, Boerne, TX (US); Jason Paul Hendry, Selma, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,642

(22) Filed: Feb. 21, 2018

Related U.S. Application Data

(60) Provisional application No. 62/461,322, filed on Feb. 21, 2017.

(51) Int. Cl.
*G06F 17/00* (2019.01)
*G06F 17/22* (2006.01)

(52) U.S. Cl.
CPC ........ *G06F 17/2288* (2013.01); *G06F 17/227* (2013.01); *G06F 17/2247* (2013.01)

(58) Field of Classification Search
CPC . G06F 17/2288; G06F 17/2247; G06F 17/227
USPC ........................................ 715/205, 209, 240
See application file for complete search history.

(56) References Cited

U.S. PATENT DOCUMENTS

| | | | |
|---|---|---|---|
| 6,593,944 B1* | 7/2003 | Nicolas | G06F 16/9577 715/744 |
| 7,640,512 B1* | 12/2009 | Appling | G06F 16/9577 715/771 |
| 9,405,425 B1* | 8/2016 | Weston | G06F 3/048 |
| 9,454,618 B1* | 9/2016 | Chen | G06F 16/951 |
| 2002/0073166 A1* | 6/2002 | Lynch | G06Q 30/02 709/217 |
| 2002/0091738 A1* | 7/2002 | Rohrabaugh | H04L 67/2823 715/249 |

(Continued)

OTHER PUBLICATIONS

Hill et al., System Architecture Directions for Networked Sensors, ACM 2000, pp. 93-104. (Year: 2000).*

(Continued)

*Primary Examiner* — Cong-Lac Huynh
(74) *Attorney, Agent, or Firm* — Fish & Richardson P.C.

(57) ABSTRACT

Implementations of the present disclosure are directed to coordinating content between a page and a frame embedded in the page, and include providing a set of events to be registered in a service layer of a third-party system, the set of events including one or more events that can be triggered through the frame, and for which respective update messages are sent from the third-party system to a service layer of an enterprise system, receiving a first update message from the third-party system, the first update message providing data representative of a first event occurring within the frame, requesting first content from one or more data sources, the first content corresponding to the first event, and updating the page to display the first content therein, the first content corresponding to content displayed in the frame.

21 Claims, 6 Drawing Sheets

(56) References Cited

U.S. PATENT DOCUMENTS

| | | | | |
|---|---|---|---|---|
| 2002/0156815 | A1* | 10/2002 | Davia | G06F 16/958 715/243 |
| 2004/0111671 | A1* | 6/2004 | Lu | G06F 17/30899 715/205 |
| 2005/0160469 | A1* | 7/2005 | Chiu | H04N 21/23418 725/112 |
| 2006/0053224 | A1* | 3/2006 | Subramaniam | H04L 67/1095 709/227 |
| 2006/0064467 | A1* | 3/2006 | Libby | G06F 17/30887 709/217 |
| 2006/0230335 | A1* | 10/2006 | Fischer | G06F 8/38 715/273 |
| 2009/0070190 | A1* | 3/2009 | Gorty | G06Q 30/02 705/14.6 |
| 2010/0179873 | A1* | 7/2010 | Li | G06Q 30/02 705/14.49 |
| 2012/0198361 | A1* | 8/2012 | Ganimasty | G06F 17/30899 715/760 |
| 2012/0254292 | A1* | 10/2012 | Newton | H04L 67/36 709/203 |
| 2012/0254722 | A1* | 10/2012 | Newton | G06F 17/30899 715/234 |
| 2013/0179767 | A1* | 7/2013 | Bajric | G06F 17/30902 715/234 |
| 2015/0347615 | A1* | 12/2015 | McGushion | H04L 67/02 715/234 |
| 2017/0134514 | A1* | 5/2017 | Greifeneder | H04L 67/02 |
| 2018/0081980 | A1* | 3/2018 | Ross | G06F 17/30893 |
| 2018/0239498 | A1* | 8/2018 | Young | G06F 3/0481 |
| 2018/0367572 | A1* | 12/2018 | Frisbie | H04L 67/34 |

OTHER PUBLICATIONS

Anderson et al., Web Montage: A Dynamic Personalized Start Page, ACM 2002, pp. 704-712. (Year: 2002).*

Hill et al., System Architecture Directions for Networked Sensors, ACM 2000, Year 2000, 12 pages.

* cited by examiner

COORDINATING IN-FRAME CONTENT WITH PAGE CONTENT IN APPLICATIONS

CROSS-REFERENCE TO RELATED APPLICATION

This application claims priority to U.S. Application Ser. No. 62/461,322, filed on Feb. 21, 2017, which is hereby incorporated by reference into the present disclosure.

BACKGROUND

Entities, such as enterprises, can provide applications to users to enable users to access products, and/or services provided by the enterprise. For example, an enterprise can provide a web application, and/or a mobile application, through which users can access the products, and/or services over a network (e.g., the Internet). In some examples, an application includes a page (e.g., a web page) that displays information to the user, and that provides one or more interfaces, through which the user can interact with the application.

In some instances, an enterprise can partner with a third-party provider to enable user access to one or more products, and/or services of the third-party provider through the application. For example, an interface associated with an application of the third-party provider can be embedded within a page of the application of the enterprise. In this manner, the user can interact with the application of the third-party provider directly through the application of the enterprise.

In some instances, the application of the enterprise displays content, and the application of the third-party provider displays other content. As the user interacts with the application of the third-party provider, the context of the content displayed in the application of the enterprise might no longer correspond to the context of the content displayed in the application of the third-party provider.

SUMMARY

Implementations of the present disclosure are generally directed to coordinating in-frame content with page content in applications. More specifically, implementations of the present disclosure are directed to updating content displayed within a page of an application based on activities, and/or content displayed in a frame that is embedded in the page. In this manner, contexts of the respective content align with one another.

Implementations of the present disclosure can include actions of providing a set of events to be registered in a service layer of a third-party system, the set of events including one or more events that can be triggered through the frame, and for which respective update messages are sent from the third-party system to a service layer of an enterprise system, receiving a first update message from the third-party system, the first update message providing data representative of a first event occurring within the frame, requesting first content from one or more data sources, the first content corresponding to the first event, and updating the page to display the first content therein, the first content corresponding to content displayed in the frame. Other implementations include corresponding systems, apparatus, and computer programs, configured to perform the actions of the methods, encoded on computer storage devices.

These and other implementations can each optionally include one or more of the following features: actions further include receiving a second update message from the third-party system, the second update message providing data representative of a second event occurring within the frame, requesting second content from one or more data sources, the second content corresponding to the second event, and updating the page to display the second content therein, the second content corresponding to content displayed in the frame after occurrence of the second event; updating the page to display the second content includes replacing the first content with the second content; updating the page to display the first content includes updating a document object model (DOM) of the page based on at least a portion of the first content; one or more data sources include one or more of a database, and an advice services infrastructure (ASI); the page includes a web page displayed in a web browser executed on a client device; and the first update message includes an HTTP POST message.

The details of one or more implementations are set forth in the accompanying drawings and the description below. Other features and advantages will be apparent from the description and drawings, and from the claims.

DETAILED DESCRIPTION

Implementations of the present disclosure are generally directed to coordinating in-frame content with page content in applications. More specifically, implementations of the present disclosure are directed to updating content displayed within a page of an application based on activities, and/or content displayed in a frame that is embedded in the page. In some implementations, actions include providing a set of events to be registered in a service layer of a third-party system, the set of events including one or more events that can be triggered through the frame, and for which respective update messages are sent from the third-party system to a service layer of an enterprise system, receiving a first update message from the third-party system, the first update message providing data representative of a first event occurring within the frame, requesting first content from one or more data sources, the first content corresponding to the first event, and updating the page to display the first content therein, the first content corresponding to content displayed in the frame.

Implementations of the present disclosure are described in further detail herein with reference to an example context. The example context includes a financial services provider (e.g., bank, insurance company) that provides Internet-based products, and/or services to users (e.g., customers). It is contemplated, however, that implementations of the present disclosure can be realized in any appropriate context.

Implementations of the present disclosure are also described in further detail herein with reference to a network-based application provided as a web-application that includes one or more web pages accessed over the Internet, the web-application including a web page having a third-party application embedded therein. It is contemplated, however, that implementations can be realized in other scenarios including, for example, a mobile application having a page, within which a third-party application is embedded.

Figure 1:
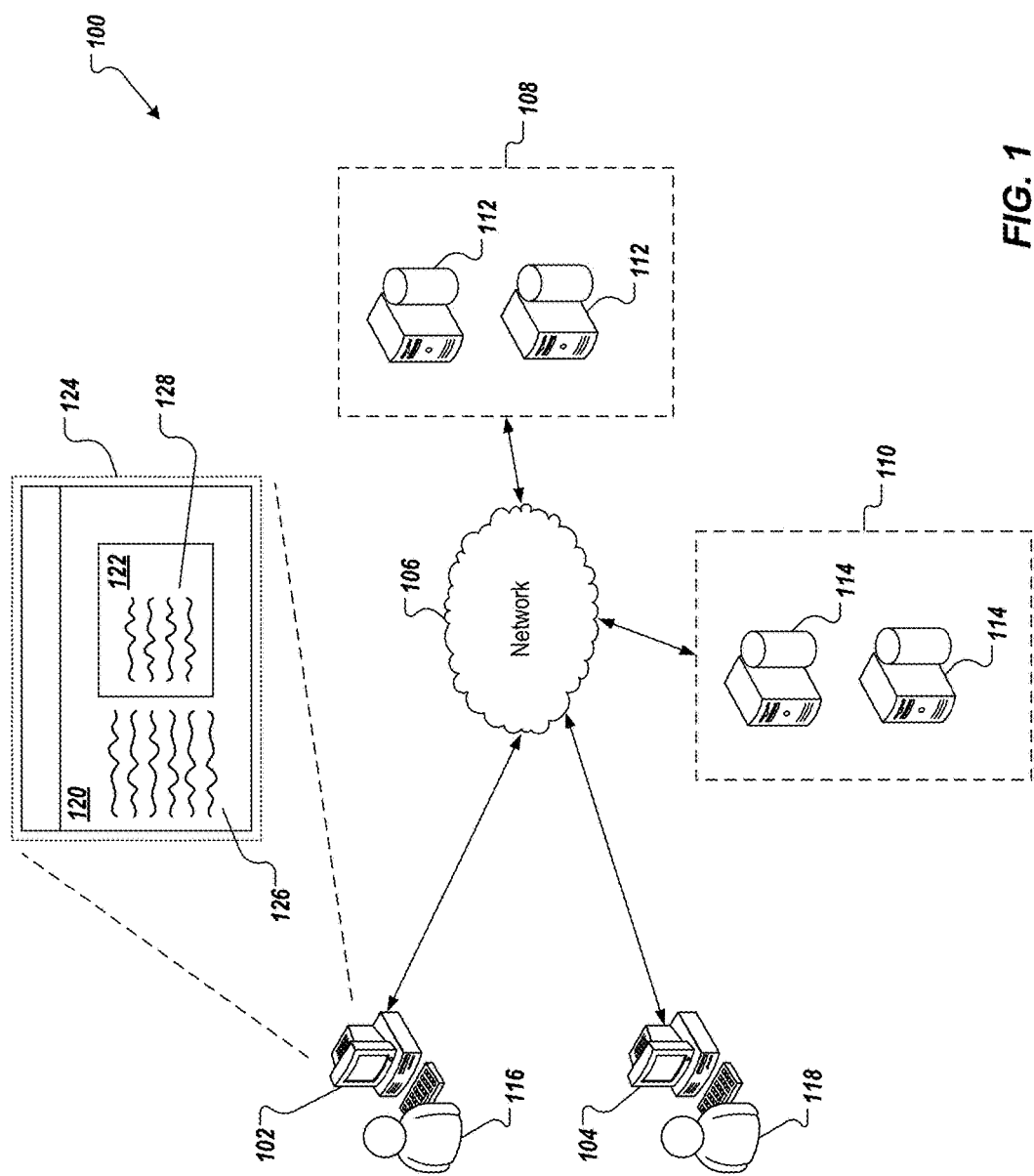
FIG. 1 depicts an example architecture that can be used to execute implementations of the present disclosure.

FIG. 1 depicts an example architecture 100 that can be used to execute implementations of the present disclosure. In the depicted example, the architecture 100 includes one or more client devices 102, 104, a server system 108, a server system 110, and a network 106. The server systems 108, 110 each include multiple servers (e.g., processors, memory) and databases (collectively referenced as 112, 114, respectively). In the context of the present disclosure, the servers 112, 114 are respective hardware and/or software platforms. In the depicted example, respective users 116, 118 interact with the client devices 102, 104. In an example context, the users 112, 114 can include users (e.g., customers, investors), who interact with a crypto-currency platform, as described in further detail herein.

In some examples, the client devices 102, 104 can communicate with the server systems 108, 110 over the network 106. In some examples, the client devices 102, 104 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server 112, 114 includes at least one server and at least one data store. In the example of FIG. 1, each server 112, 114 is intended to represent various forms of servers including, but not limited to a web server, an application server, a proxy server, a network server, and/or a server pool. In general, servers accept requests for application services and provide such services to any number of client devices (e.g., the client devices 102, 104 over the network 106).

In accordance with the context of the present disclosure, one or more servers 112, 114 of the server systems 108, 110 can host respective web-based applications that can be accessed by users 116, 118 using the client devices 102, 104, respectively. For example, the server system 108 can host a web-application provided by an enterprise, the web-application including one or more web pages that can be displayed in web browsers executed on the client devices 102, 104. The server system 110 can host a web-application provided by a third-party provider, the web-application including one or more web pages that can be displayed in web browsers executed on the client devices 102, 104.

In accordance with implementations of the present disclosure, the web-application of the enterprise can embed the web-application of the third-party provider. In this manners, the users 116, 118 can access products, and/or services of the third-party provider (i.e., the web-application of the third-party provider) through the web-application of the enterprise. For example, and as described in further detail herein, the web-application of the third-party provider can be embedded within one or more web pages of the web application of the enterprise.

In the example context, the web-application of the enterprise can enable the users 116, 118 to access one or more accounts (e.g., savings, checking, insurance) held by the enterprise on behalf of the users 116, 118. The web-application of the third-party service provider can provide one or more financial tools based on the one or more accounts (e.g., an account summary tool, a transaction summary tool, a spending analysis tool, a budgeting tool, a trends tool).

In accordance with implementations of the present disclosure, and as described in detail herein, as the user 116, 118 navigates a financial tool embedded in a web page of the web-application of the enterprise, content that is displayed within the financial tool changes. Implementations of the present disclosure enable content displayed within the web page, but external to the financial tool to change in response to content changes within the financial tool. In this manner, contexts of the respective content align with one another.

More particularly, implementations of the present disclosure enable content of a web page 120, and a frame 122 to be coordinated. For example, a web browser 124 executing on the client device 102 (or the client device 104) displays the web page 120 with the frame 122 embedded therein. In accordance with the example content, the web page 120 can be provided by a financial services enterprise (FSE) to enable users to access one or more accounts (e.g., savings, checking, insurance) held by the enterprise, and the frame 122 can enable interaction with financial tools (e.g., an account summary tool, a transaction summary tool, a spending analysis tool, a budgeting tool, a trends tool) of a third-party provider (TPP). The web page 120 can display content 126, and the frame 122 can display content 128. In some examples, the content 126 can include user-specific content (e.g., account information specific to the user), and/or general content (e.g., financial advice). In some examples, the content 128 can include user-specific content (e.g., summaries/analyses of account information specific to the user), and/or general content.

In some implementations, the web page 120 has an underlying document object model (DOM) that defines the appearance, and/or functionality of the web page 120. In some examples, a DOM can be described as a cross-platform, language-independent application programming interface (API) that treats an electronic document (e.g., HTML, XHTML, XML document) as a free structure including nodes as respective objects, each object representing a part of the electronic document. In some examples, objects of the DOM can be programmatically manipulated to provide visible, and/or functional changes that are reflected in the display of the electronic document (e.g., as the web page 120 in the web browser 124).

In some implementations, the underlying electronic document, and corresponding DOM, of the web page 120 includes instructions to embed the frame 122 therein, and includes an end-point (e.g., uniform resource indicator (URI), such as a uniform resource locator (URL)) that points to the application of the third-party provider that is to be displayed within the frame 122. Accordingly, the web page 120 receives user interfaces (UIs) and content of the third-party service provider based on the end-point, and serves (displays) the UIs and content in the frame 122. For example, the web page 120 can provide a request (e.g., FSP.launchTargetURI[URI//target=budget]), and in response, receive an electronic document from the third-party provider, which electronic document includes the UIs, and content to be displayed in the frame 122.

Figure 2:
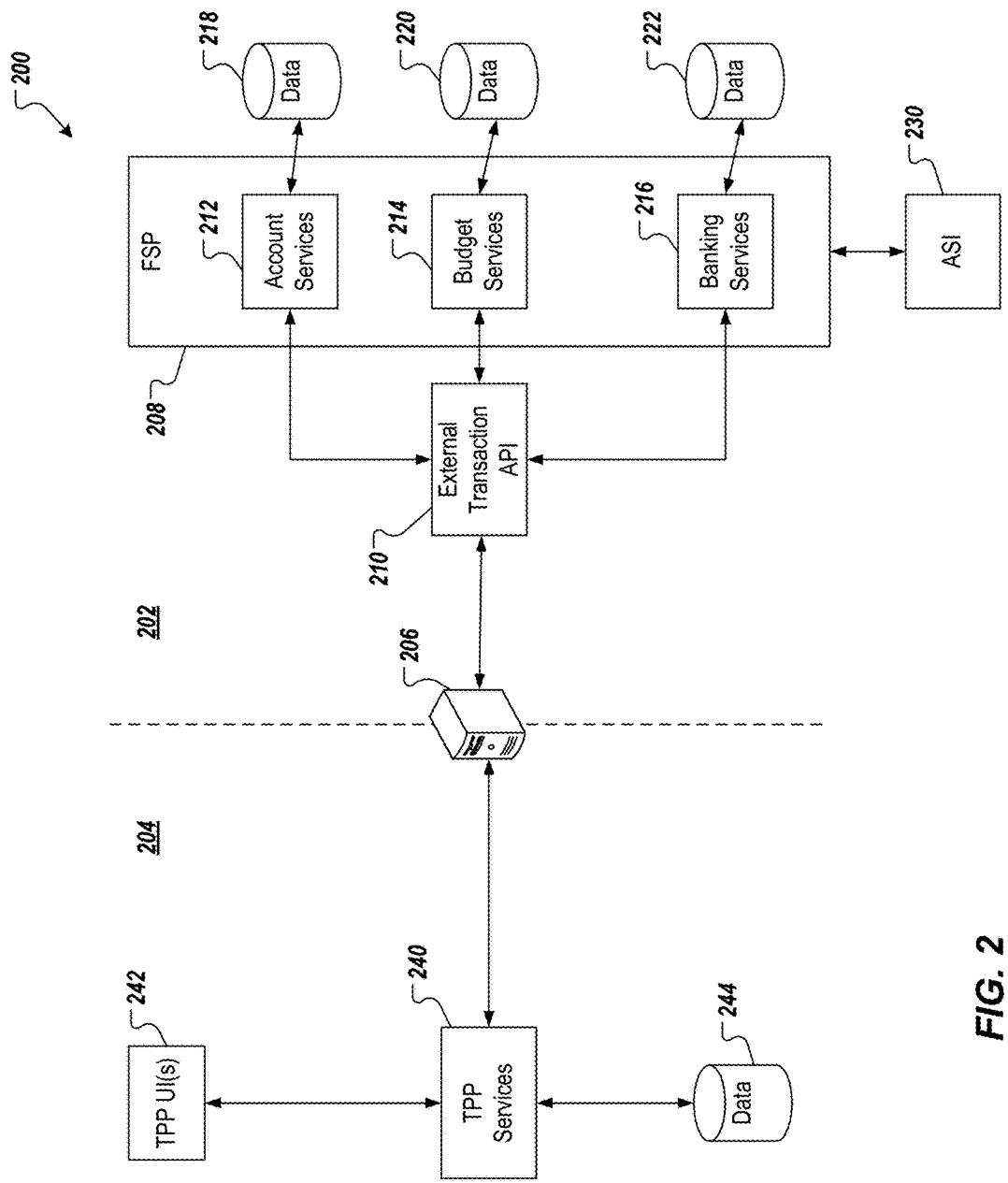
FIG. 2 depicts an example architecture in accordance with implementations of the present disclosure.

FIG. 2 depicts an example architecture 200 in accordance with implementations of the present disclosure. In some examples, and as described in further detail herein, the example architecture 200 enables a system of an enterprise (e.g., a FSE) and a system of a TPP to update one another based on user interactions with the respective systems. In the depicted example, the example architecture 200 includes an FSE system 202, and a TPP system 204, which communicate with one another through a gateway 206 (e.g., a network node that serves as an entrance between networks, acting as a proxy server and a firewall).

In the example of FIG. 2, the FSE system 202 includes a set of services 208 that communicate with the TPP system 204 through an external transaction API 210. In some examples, the FSE exposes the external transactions API 210 to enable services of the set of services 208 to be updated based on transactions in the TPP system 204, as described in further detail herein. The set of services 208 includes one or more computer-implemented services that the FSE provides to its users. In accordance with the example context, the set of services 208 include account services 212, budget services 214, and banking services 216. In some examples, each service communicates with a respective data store 218, 220, 222. Although distinct data stores are depicted, it is contemplated that a single data store can be provided, with which, each of the services interact (e.g., read data from, write data to).

In some examples, the account services 212 enable a user to access account information (e.g., savings, checking) stored in the data store 218. For example, the user can view a list of accounts, activities, balances, and the like (e.g., in the web page 120 of FIG. 1). In some examples, the budget services 214 enable a user to access budgeting information (e.g., budgets, goals) stored in the data store 220. For example, the user can view a list of budgets, goals, and the like (e.g., in the web page 120 of FIG. 1). In some examples, the banking services 216 enable a user to execute banking activities (e.g., transferring funds to/from accounts) based on information stored in the data store 222.

The example architecture 200 also includes an advice service infrastructure (ASI) 230. An example ASI 230 can provide advice (e.g., budgeting advice, financial planning advice). In some examples, the ASI 230 determines at least a portion of content that is to be displayed in a web page (e.g., at least a portion of the content 126 that is to be displayed in the web page 120 of FIG. 1). For example, the ASI 230 can determine that budgeting advice is to be displayed as at least a portion of the content of a web page. Consequently, the web page can receive the budgeting advice from a database.

The TPP system 204 hosts computer-implemented services 240, with which users of the FSE system 202 can interact. Continuing with the example context, example service 240 can include an account summary tool, a transaction summary tool, a spending analysis tool, a budgeting tool, and a trends tool. In some implementations, interactions with the TPP services 240 are conducted through one or more TPP UIs 242. For example, the one or more TPP UIs 242 can be displayed in the frame 122 embedded in the web page 120, as described herein. In some examples, the TPP services 240 interact with data stored in a data store 244 of the TPP system 204. In some examples, data stored in the data store 244 can include user data provided from the FSE system 202, and/or data provided by the one or more TPP services 240 (e.g., budget data, trend data, etc. generated by the TPP service(s) 240).

In general, the example architecture of FIG. 2 depicts interactions between the FSE system 202, and the TPP system 204 at the service layer. More particularly, example layers can include a UI layer, a service layer, and a data layer. The example architecture 200 of FIG. 2 represents communication between the FSE system 202, and the TPP system 204 at the service layer (e.g., as opposed to interactions between the FSE system 202, and the TPP system 204 occurring between respective UIs at the UI layer, and/or between respective database systems at the data layer). In this manner, the TPP services 240 hosted in the TPP system 204 update (in real-time) services of the set of service 208 in the FSE system.

As described in further detail herein, implementations of the present disclosure enable user navigation within the frame 122 to be informed to the FSE system 202, such that the content 126 of the web page 120 can be selectively updated (e.g., in response to updates to the content 128 changing as a result of navigation within the frame 122). In this manner, the context of the content 126 (e.g., budgeting) can align with (e.g., be the same as) the context of the content 128, as the content 128 changes in response to user navigation within the frame 122 (e.g., the user moving from a budgeting tool to a financial planning tool).

In accordance with implementations of the present disclosure, page content (e.g., the content 126 of FIG. 1) is coordinated with in-frame content (e.g., the content 128 of FIG. 1) using real-time updates at the service layer. In some implementations, real-time updates are provided through update messages communicated from a TPP service (e.g., the TPP services 240 of FIG. 2) to a FSE system (e.g., the FSE system 202 of FIG. 2). In some implementations, the update messages are provided as so-called WebHooks. A WebHook can be described as a hypertext transfer protocol (HTTP) callback that occurs in response to an event. In some examples, a HTTP POST message (e.g., POST update) is sent from the TPP system to the FSE system in response to an event. In general, using WebHooks, a web application (e.g., the TPP services 240 of FIG. 2) POST a message to a URL (e.g., of the external transaction API 210 of FIG. 2) when an event occurs.

In some examples, each message (e.g., POSTupdate message) includes a payload that provides data descriptive of the event that triggered sending of the message. Example data can include, without limitation, category data, description data, user ID data, and UI ID data. In some examples, the category data indicates a category of the event. Example categories can include, without limitation, navigation (e.g., navigating from one TPP UI (budgeting tool) to another TPP UI (account summary tool)), and data update (e.g., updating data within a displayed TPP UI). In some examples, the description data includes a description of the event (e.g., navigating between TPP tools, updating budget data, updating account data). In some examples, the user ID includes an identifier uniquely identifying the user in the TPP system and the FSE system (e.g., the user 116 of FIG. 1 interacting with the FSE system 202 through the web page 120, and the TPP system 204 through the frame 122). In some examples, the UI ID data includes an identifier uniquely identifying a TPP UI that the user was interacting with (and/or navigated to), which triggered the event.

In some examples, a set of events can be provided and registered with the TPP services, and, for each event, payload contents can be defined. For example, an example event can include a navigation event, and the payload can be defined to include: EventType=navigation; Desc=navigating between UIs; UserID=A1B2C3D4; OriginUI_ID=QRS; DestinationUI_ID=XYZ. Consequently, in response to occurrence of a navigation event, an update message is sent from the TPP system to the FSE system, and includes the defined payload. If, however, an event occurs that is not included in the set of events, no update message is sent from the TPP system to the FSE system for that event.

In some examples, the FSE system receives the update message, and updates one or more services in response thereto. More particularly, and in accordance with implementations of the present disclosure, the FSE system updates content within a page (e.g., the content 126 of the web page 120) in response to an update message indicating occurrence of an event initiated through a frame embedded in the page (e.g., the frame 122 embedded in the web page 120).

For example, the user can interact with a budgeting tool (e.g., a TPP service 240) through a budgeting tool UI (e.g., a TPP UI 242) that is displayed in a frame of a page (e.g., the frame 122 embedded in the web page 120) provided by a FSE (e.g., the FSE system 204). The user can navigate from the budgeting tool to an account summary tool (e.g., a TPP service 240) within the frame, and in response, an account summary tool UI (e.g., a TPP UI 242) is displayed in the frame of the page. In response to the navigation between tools, the TPP system recognizes occurrence of a navigation event, determines that the navigation event is included in the set of events, and sends a corresponding update message to the FSE system, as described herein.

The FSE system receives the update message from the TPP system, and process the update message to selectively update content within the page. For example, prior to the navigation event, the content of the page includes content associated with budgeting (e.g., general advice for creating and maintaining a budget). In response to the navigation event, the content of the page is changed to include content associated with account summaries.

In some implementations, the content that is to be displayed in the page (e.g., the content 126 of the web page 120) can be determined based on the type of event. For example, if it is determined that the event was a navigation event to a retirement planning UI within the frame, retirement planning content can be retrieved (e.g., from the ASI system 230 of FIG. 2), and can be displayed as the content in the page. Accordingly, general content (e.g., user-agnostic content) is displayed. In some implementations, the content that is to be displayed in the page can be determined based on the particular user. For example, if it is determined that the event was a data update event within a budgeting tool UI within the frame, budgeting information of the user can be retrieved (e.g., from the budget services 214 of FIG. 2), and can be displayed as the content in the page. Accordingly, user-specific content is displayed.

This process can repeat in response to user interactions (e.g., navigation) within the frame 122 to continuously update the content 126 in response to changes in the context of the content 128 to ensure that the contexts align (e.g., if budget-related content is displayed in the frame 122, budget-related content is displayed in the web page 120; if retirement-related content is displayed in the frame 122, retirement-related content is displayed in the web page 120).

Implementations of the present disclosure also provide for data collection based on events occurring in the frame. For example, data on user interactions with TPP tools within the frame can be collected from update message provided to the FSE system. The data can be processed to identify one or more usage patterns indicative (e.g., processing the user interaction data using machine-learning). In some examples, the FSE system can proactively update content of the page based on the usage patterns.

Figure 3A:
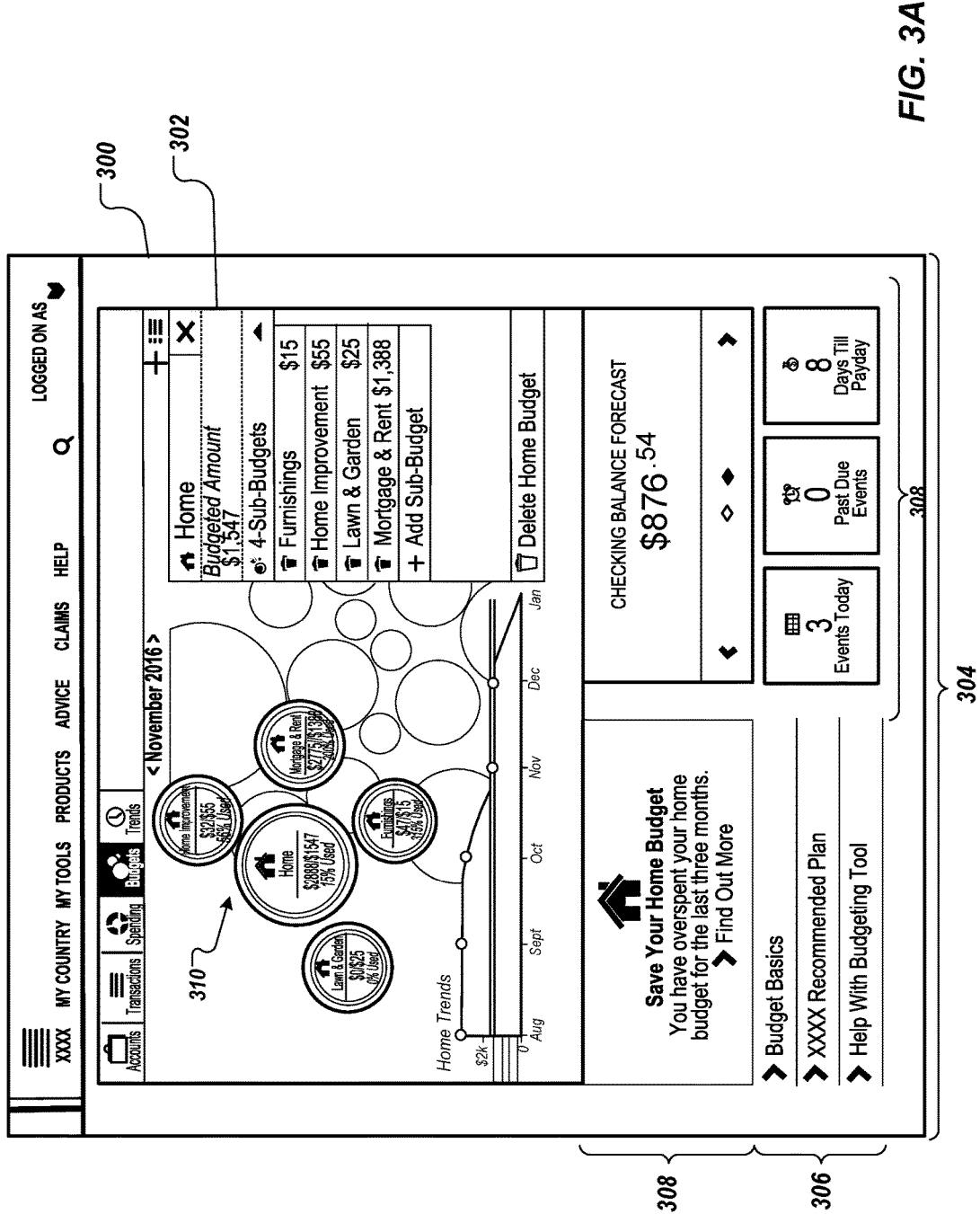
FIGS. 3A-3C depict an example web page in accordance with implementations of the present disclosure.
Figure 3B:
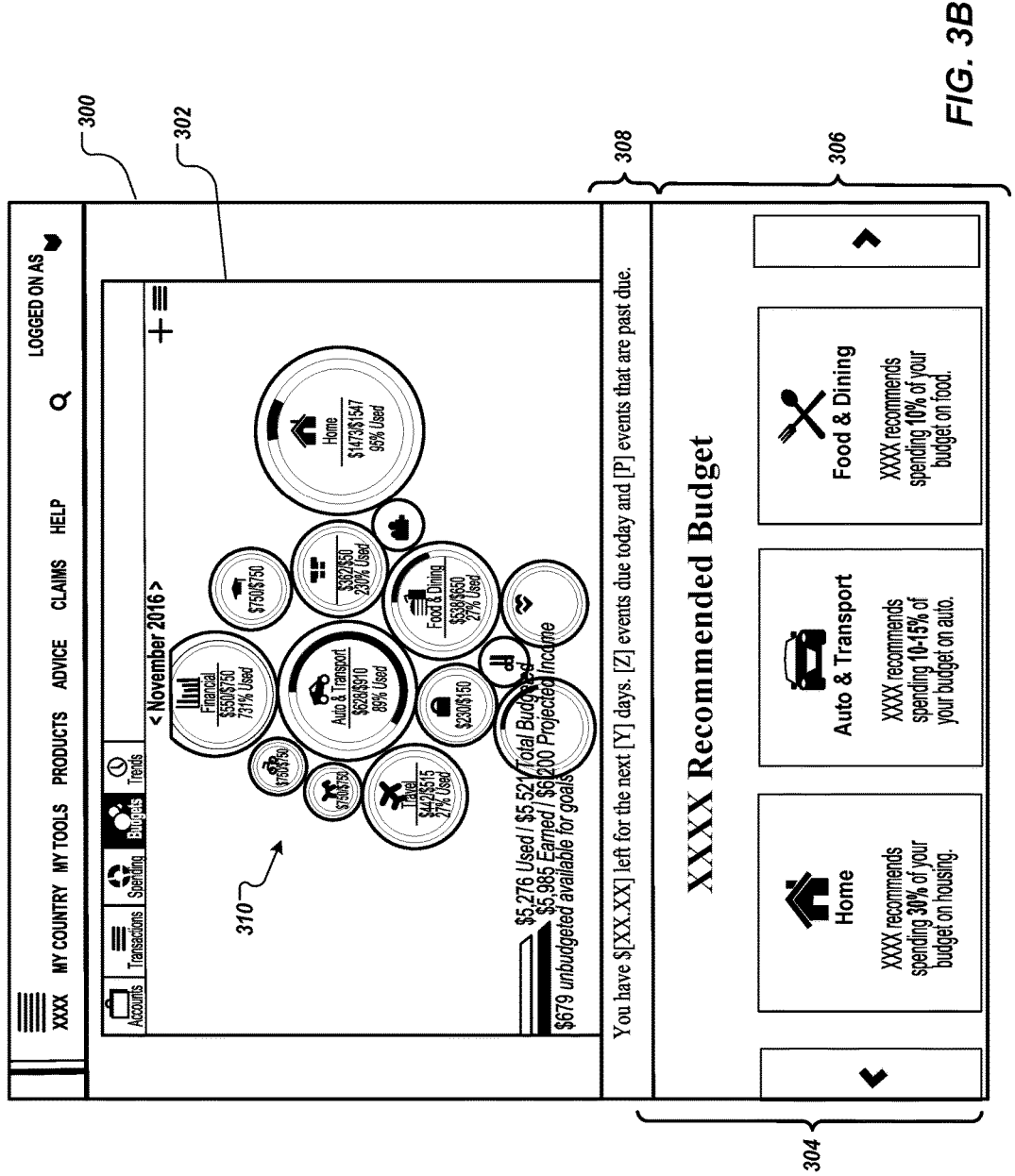
Figure 3C:
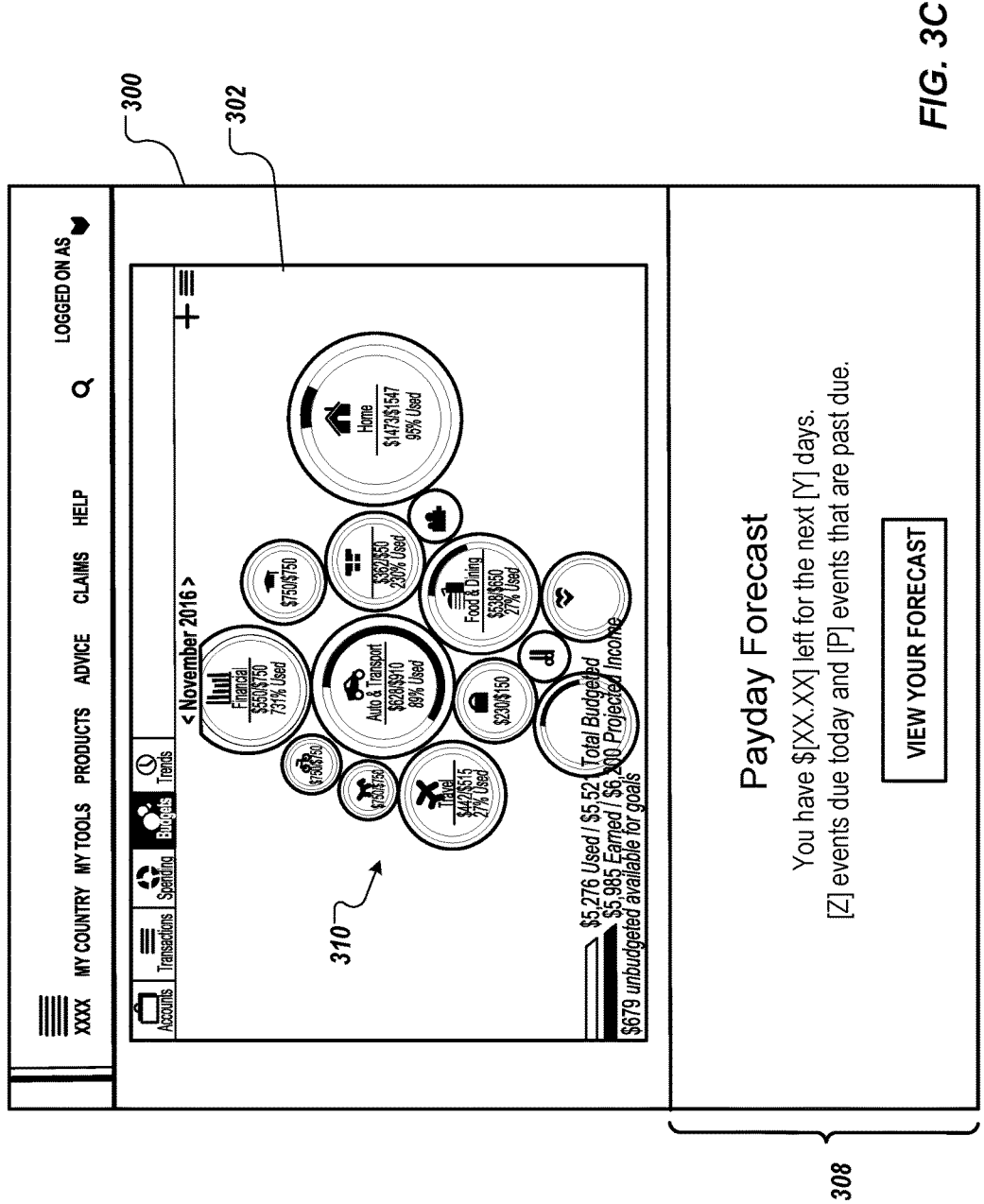

FIGS. 3A-3C depict an example web page 300 in accordance with implementations of the present disclosure. A frame 302 is embedded in within the web page 300. In the examples context, the web page 300 is provided by, or on behalf of a financial services enterprise, and an application accessed through the frame 302 is provided by a third-party provider. In the depicted example, the web page 300 displays content 304 that includes general content 306, and user-specific content 308. In some examples, the general content 306 is consistent across all user's (e.g., the same content 306 is displayed for any user). In some examples, the user-specific content 308 is specific to the user that is logged into the web application providing the web page 300. In the depicted example, the user-specific content 308 indicates how much money the user has remaining until a next payday (e.g., $876.54 left for the next 8 days), a number of events (e.g., bill payments) due today, and a number of events (e.g., bill payments) that are past due.

In some implementations, the frame 302 displays content and interfaces provided by the third-party service provider. In this example, the third-party service provider provides financial tools that the user can interact with through the frame 302. In the depicted example, financial tools include an account summary tool, a transaction summary tool, a spending analysis tool, a budgeting tool, a trends tool. In the example of FIG. 3, the budgeting tool is selected, and the frame 302 displays content 310 reflecting expenditures and budgeting information for the user.

In accordance with implementations of the present disclosure, because the frame 302 is depicting content 310 including budgeting information (e.g., the budgeting tool is selected), the content 304 is associated with budgeting. If, for example, the content 310 of the frame 302 were to change to another context (e.g., net worth, debt pay down) different from budgeting, the content 304 would also change, as described herein, to reflect the same context as the frame 302.

FIGS. 3B and 3C depict other examples of content 304, 306, 308 that can be displayed in the web page 300.

Figure 4:
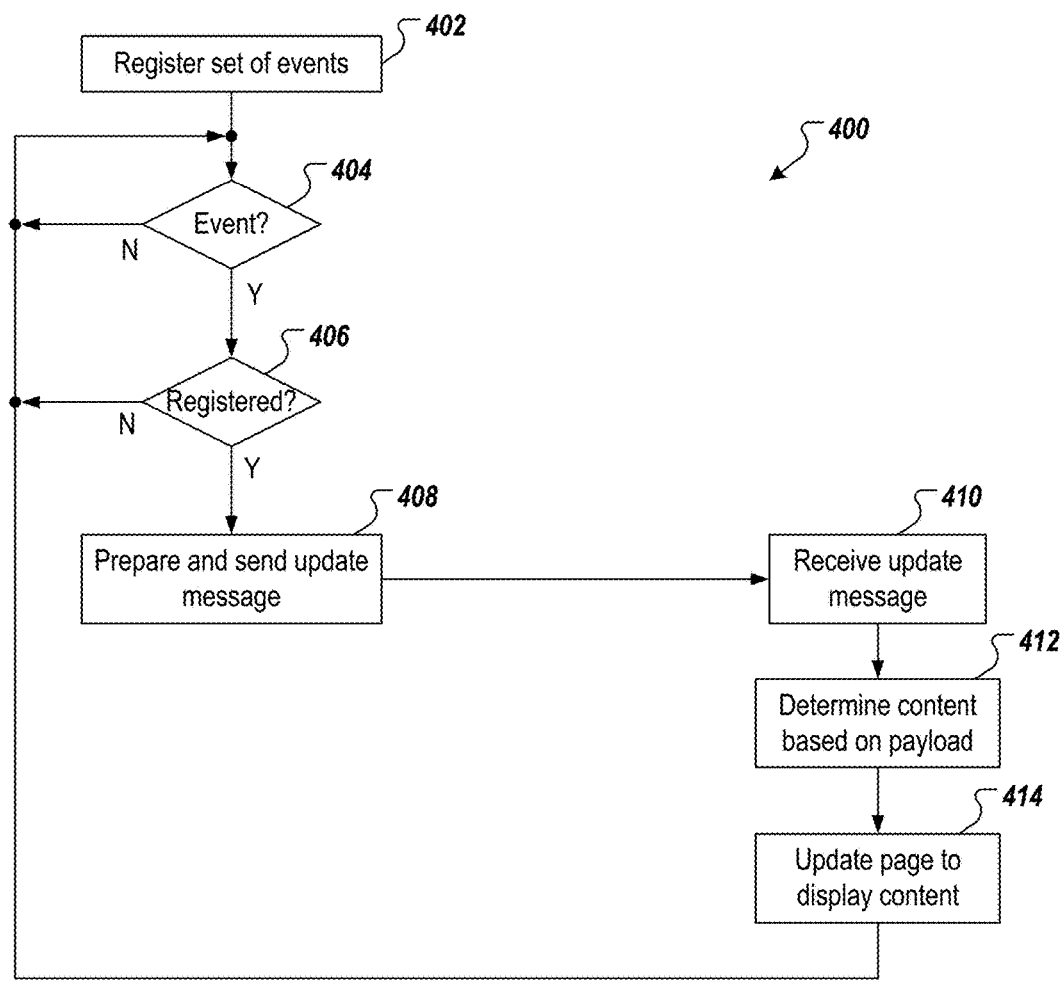
FIG. 4 depicts an example process that can be executed in accordance with implementations of the present disclosure.

FIG. 4 depicts an example process 400 that can be executed in accordance with implementations of the present disclosure. In some examples, the process 400 is provided by one or more computer-executable programs executed by one or more computing devices.

A set of events is registered (402). For example, a WebHooks infrastructure can be established within a TPP system, which includes a set of events, for which update messages are to be transmitted to a FSE system. It is determined whether an event has occurred (404). If it is determined that an event has not occurred, the example process 400 loops back. If it is determined that an event has occurred, it is determined whether the event is a registered event (406). For example, it is determined whether the event is included in the set of events. If the event is not a registered event, the example process 400 loops back. If the event is a registered event, an update message is prepared and sent (408). In some examples, the update message is a HTTP callback that occurs in response to the event. In some examples, a HTTP POST message (e.g., POST update) is sent from the TPP system to the FSE system in response to the event.

The update message is received (410). For example, the FSE system receives the update message from the TPP system. Content is determined based on a payload of the updated message (413). In some examples, each message (e.g., POSTupdate message) includes a payload that provides data descriptive of the event that triggered sending of the message. Example data can include, without limitation, category data, description data, user ID data, and UI ID data. A page is updated to display the content (414), and the example process 400 loops back.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the architectures 100, 200 of FIGS. 1 and 2, respectively, can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs (i.e., one or more modules of computer program instructions) encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry (e.g., an FPGA (field programmable gate array) or an ASIC (application specific integrated circuit)). The apparatus can also include, in addition to hardware, code that creates an execution environment for the computer program in question (e.g., code that constitutes processor firmware), a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA, an ASIC).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the invention. Accordingly, other embodiments are within the scope of the following claims.

What is claimed is:

1. A computer-implemented method for coordinating content between a page and a frame embedded in the page, the method being executed by at least one processor and comprising:
providing, by the at least one processor, a set of events to be registered in a service layer of a third-party system, the set of events comprising one or more events that can be triggered through the frame, and for which respective update messages are sent from the third-party system to a service layer of an enterprise system;
receiving, by the at least one processor, a first update message from the third-party system, the first update message providing data representative of a first event in the set of events that occurs within the frame and causes a display of initial content within the frame, the data indicating a context of the initial content;
in response to receiving the first update message, requesting, by the at least one processor, first content from one or more data sources, the first content being different from the initial content and corresponding to the context of the initial content displayed in the frame; and
updating, by the at least one processor, a portion of the page outside of the frame to display the first content therein.

2. The method of claim 1, further comprising:
receiving a second update message from the third-party system, the second update message providing data representative of a second event occurring within the frame;
requesting second content from one or more data sources, the second content corresponding to the second event; and
updating the portion of the page outside of the frame to display the second content therein, the second content corresponding to content displayed in the frame after occurrence of the second event.

3. The method of claim 2, wherein updating the portion of the page to display the second content comprises replacing the first content with the second content.

4. The method of claim 1, wherein updating the portion of the page to display the first content comprises updating a document object model (DOM) of the page based on at least a portion of the first content.

5. The method of claim 1, wherein one or more data sources comprise one or more of a database, and an advice services infrastructure (ASI).

6. The method of claim 1, wherein the page comprises a web page displayed in a web browser executed on a client device.

7. The method of claim 1, wherein the first update message comprises an HTTP POST message.

8. A non-transitory computer-readable storage medium coupled to one or more processors and having instructions stored thereon which, when executed by the one or more processors, cause the one or more processors to perform operations for coordinating content between a page and a frame embedded in the page, the operations comprising:
providing a set of events to be registered in a service layer of a third-party system, the set of events comprising one or more events that can be triggered through the frame, and for which respective update messages are sent from the third-party system to a service layer of an enterprise system;
receiving a first update message from the third-party system, the first update message providing data representative of a first event in the set of events that occurs within the frame and causes a display of initial content within the frame, the data indicating a context of the initial content;
in response to receiving the first update message, requesting first content from one or more data sources, the first content being different from the initial content and corresponding to the context of the initial content displayed in the frame; and
updating a portion of the page outside of the frame to display the first content therein.

9. The computer-readable storage medium of claim 8, wherein operations further comprise:
receiving a second update message from the third-party system, the second update message providing data representative of a second event occurring within the frame;
requesting second content from one or more data sources, the second content corresponding to the second event; and
updating the portion of the page to display the second content therein, the second content corresponding to content displayed in the frame after occurrence of the second event.

10. The computer-readable storage medium of claim 9, wherein updating the portion of the page to display the second content comprises replacing the first content with the second content.

11. The computer-readable storage medium of claim 8, wherein updating the portion of the page to display the first content comprises updating a document object model (DOM) of the page based on at least a portion of the first content.

12. The computer-readable storage medium of claim 8, wherein one or more data sources comprise one or more of a database, and an advice services infrastructure (ASI).

13. The computer-readable storage medium of claim 8, wherein the page comprises a web page displayed in a web browser executed on a client device.

14. The computer-readable storage medium of claim 8, wherein the first update message comprises an HTTP POST message.

15. A system, comprising:
one or more processors; and
a computer-readable storage device coupled to the one or more processors and having instructions stored thereon which, when executed by the one or more processors, cause the one or more processors to perform operations for coordinating content between a page and a frame embedded in the page, the operations comprising:
providing a set of events to be registered in a service layer of a third-party system, the set of events comprising one or more events that can be triggered through the frame, and for which respective update messages are sent from the third-party system to a service layer of an enterprise system;
receiving a first update message from the third-party system, the first update message providing data representative of a first event in the set of events that occurs within the frame and causes a display of initial content within the frame, the data indicating a context of the initial content;

in response to receiving the first update message, requesting first content from one or more data sources, the first content being different from the initial content and corresponding to the context of the initial content displayed in the frame; and updating a portion of the page outside of the frame to display the first content therein.

16. The system of claim 15, wherein operations further comprise:

receiving a second update message from the third-party system, the second update message providing data representative of a second event occurring within the frame;

requesting second content from one or more data sources, the second content corresponding to the second event; and updating the portion of the page to display the second content therein, the second content corresponding to content displayed in the frame after occurrence of the second event.

17. The system of claim 16, wherein updating the portion of the page to display the second content comprises replacing the first content with the second content.

18. The system of claim 15, wherein updating the portion of the page to display the first content comprises updating a document object model (DOM) of the page based on at least a portion of the first content.

19. The system of claim 15, wherein one or more data sources comprise one or more of a database, and an advice services infrastructure (ASI).

20. The system of claim 15, wherein the page comprises a web page displayed in a web browser executed on a client device.

21. The system of claim 15, wherein the first update message comprises an HTTP POST message.

* * * * *